United States Patent [19]

Durham

[11] Patent Number: 4,605,208

[45] Date of Patent: Aug. 12, 1986

[54] COMBINATION AUTOMATIC AND MANUAL VISE APPARATUS

[76] Inventor: Randy E. Durham, 307 N. Magnolia, Woodville, Tex. 75979

[21] Appl. No.: 719,981

[22] Filed: Apr. 4, 1985

[51] Int. Cl.$^4$ .............................................. B23Q 3/08

[52] U.S. Cl. ...................................... 269/32; 269/247

[58] Field of Search ............... 269/246, 247, 244, 245, 269/240, 32, 20

[56] References Cited

U.S. PATENT DOCUMENTS

| | | | |
|---|---|---|---|
| 2,985,048 | 5/1961 | De Hart | 269/247 |
| 3,488,046 | 1/1970 | Quick et al. | 269/245 |
| 3,752,464 | 8/1973 | Csatlos | 269/32 |

*Primary Examiner*—Robert C. Watson
*Attorney, Agent, or Firm*—Phillip A. Rein

[57] ABSTRACT

This invention is a combination automatic and manual vise apparatus selectively operable (1) as a normal manually operated table vise structure; and (2) as a power driven vise structure. The automatic and manual vise apparatus includes a main support base assembly; a manual vise assembly connected to the main support base assembly; and an automatic vise assembly connected to the main support base assembly and the manual vise assembly. The manual vise assembly includes a stationary jaw assembly connected to the main support base assembly and a moveable jaw assembly connected to the stationary vise assembly. The moveable jaw assembly includes a handle member which is rotated to move a jaw member relative to the stationary jaw assembly in a conventional manner. A lock member is used to secure the handle member against a rotation when utilizing the invention as a power driven vise structure. The automatic vise structure includes (1) an automatic actuator assembly operably connected through an actuator sleeve member to the moveable jaw assembly; (2) a power drive assembly with a drive motor connected to the actuator sleeve member; and (3) a control assembly connected to said drive motor. The automatic actuator assembly includes a sleeve lock member which is released from the actuator sleeve member which is then selectively rotated by the drive motor to move the moveable jaw assembly on operation of the control assembly as by fluid power.

16 Claims, 4 Drawing Figures

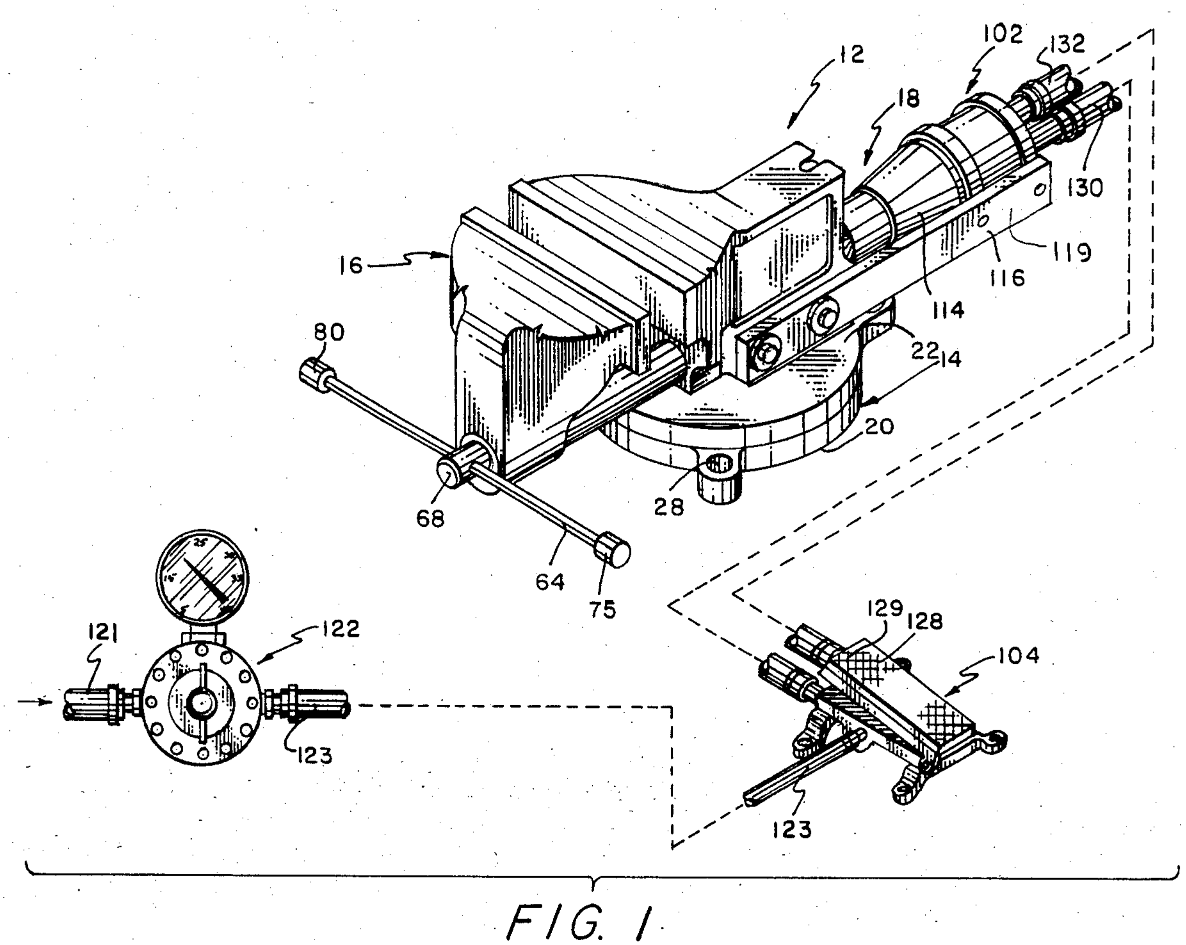
F/G. 1
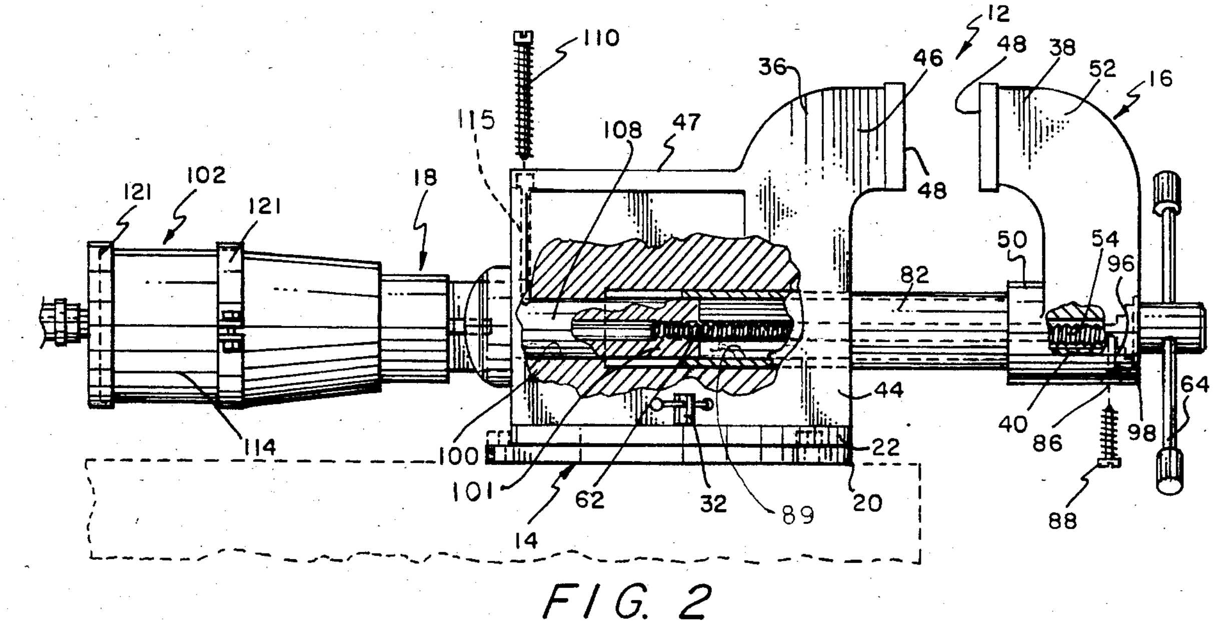
F/G. 2

COMBINATION AUTOMATIC AND MANUAL VISE APPARATUS

PRIOR ART

A patent search was conducted on the above-identified invention and the following United States Patent references were located:

U.S. Pat. No. 2,289,597, Jay L. Seat;
U.S. Pat. No. 2,345,401, Carl J. Lindegran;
U.S. Pat. No. 2,693,727, Elmer T. Olson;
U.S. Pat. No. 3,488,046, Quick et al;
U.S. Pat. No. 4,102,372, Angelo Cremona.

The Seat patent is a basic reference drawn to a pneumatic operated vise having a foot control and utilizing fluid pressure to move the vise into a clamped condition and a spring is used to release the same. The Seat patent does not have the other new and novel features of the applicant's invention as set forth hereinafter.

The Quick et al patent discloses the use of an air motor with dual operating lines but is lacking in other features noted in the applicant's invention.

The Lindegran patent discloses a fluid operated vise structure having the pressure fluid operable to move a portion of the vise in both directions with limited travel until the same is allowed to be moved a greater distance by actuation of an adjustable nut member.

The Olson patent teaches the dual operation of an automatic and manually operated vise structure which is automatically moveable through the use of a piston and cylinder structure.

It is noted that although some features of the invention are shown by the patent references found in the patentability search of the prior art, the applicant has numerous features set forth herein that are not set forth in the subject patents.

PREFERRED EMBODIMENTS OF THE INVENTION

In one preferred embodiment of the invention, a combination automatic and manual vise apparatus is provided which can be easily secured in a conventional manner as by nut and bolt members to a working bench and having an upper portion thereof rotatable to various positions for ease of usage. The combination automatic and manual vise apparatus includes (1) a main support vise assembly; (2) a manual vise assembly secured to the main support base assembly; and (3) an automatic vise assembly connected to the manual vise assembly. The manual vise assembly includes a stationary jaw assembly; a movable jaw assembly movable relative to and in cooperation with the stationary jaw assembly; and (3) a vise actuator assembly interconnecting the movable jaw assembly to the stationary jaw assembly. The automatic vise assembly includes (1) an automatic actuator assembly; (2) a power drive assembly, and (3) a pneumatic control assembly. The automatic actuator assembly includes an actuator sleeve member which is selectively rotatable in order to move the movable jaw assembly relative to the stationary jaw assembly. The power drive assembly includes a fluid drive motor member which is selectively operable through the control of the pneumatic control assembly to rotate the actuator sleeve member which, in turn, is operable to move the movable jaw assembly inwardly and outwardly relative to the stationary jaw assembly. A sleeve lock member and a screw shaft lock member are operable to be selectively engagable with portions of the movable jaw assembly and the actuator sleeve member for conversion thereof from (1) a conventional manual operated vise assembly to (2) an automatic vise assembly.

OBJECTS OF THIS INVENTION

One object of this invention is to provide a combination automatic and manual vise apparatus which resembles a conventional vise structure and being operable (1) as a conventional manual type vise structure with movement through the rotation of a handle member; and (2) as an automatic vise structure which is operable through fluid power means to move a movable jaw assembly relative to a stationary jaw assembly through the use of fluid power means.

Another object of this invention is to provide a combination automatic and manual vise apparatus having simplified lock means thereon for ready conversion from a manual vise operation to an automatic vise operation and vice versa.

Still, one further object of this invention is to provide a combination automatic and manual vise apparatus which resembles a conventional standard manual vise structure except having a fluid drive motor connected to an outer end thereof which is selectively operable in the automatic mode for movement of a movable jaw assembly.

Still, one further object of this invention is to provide a combination automatic and manual vise apparatus having a foot operated pneumatic control means whereupon the vise structure can be moved inwardly and outwardly for clamping action without requiring the use of the person's hands which can then be utilized to hold an item before the same is grasped and clamped.

Various other objects, advantages, and features of the invention will become apparent to those skilled in the art from the following discussion, taken in conjunction with the accompanying drawings, in which:

FIGURES OF THE INVENTION

FIG. 1 is a perspective view of a combination automatic and manual vise apparatus of this invention illustrated as connected by dotted lines to automatic controls therefore;

FIG. 2 is a side elevational view of the combination automatic and manual vise apparatus of this invention having portions thereof broken away for clarity;

Figure 3:
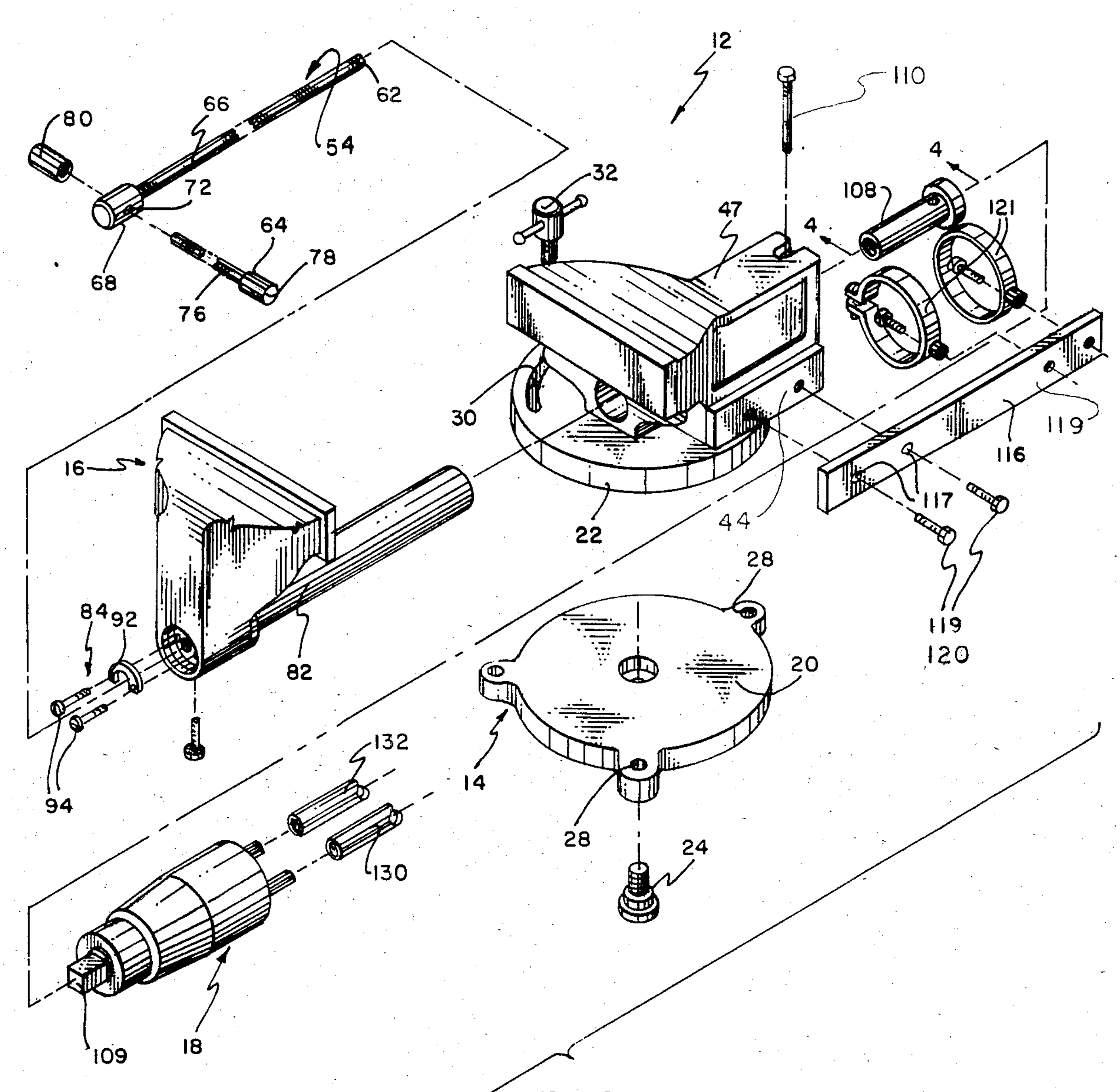
FIG. 3 is an exploded perspective view of the combination automatic and manual vise apparatus of this invention without the automatic controls.

The following is a discussion and description of preferred specific embodiments of the new combination automatic and manual vise apparatus of this invention, such being made with reference to the drawings, whereupon the same reference numerals are to be used to indicate the same or similar parts and/or structures. It is to be understood that such discussion and description is not to unduly limit the scope of the invention.

DESCRIPTION OF THE INVENTION

As noted in FIG. 1, the combination automatic and manual vise apparatus of this invention, indicated generally at 12, is normally secured to a work bench member as by a plurality, namely, three (3) nut and bolt members to anchor a support portion thereto. The combination automatic and manual vise apparatus 12 includes (1) a main support base assembly 14 which is anchored to the work bench; (2) a manual vise assembly 16 which is mounted on the main support base assembly 14; and (3) an automatic vise assembly 18 operably connected to the manual vise assembly 16.

The main support base assembly 14 includes (1) a main anchor plate 20; and (2) a vise support plate 22 which is pivotally connected to the main anchor plate 20 through a connector member 24. The main anchor plate 20 is of a circular shape having laterally extended projections with anchor holes 28 therein which are adapted to receive the nut and bolt members therethrough for conventionally anchoring to the top surface of the work bench member.

The vise support plate 22 is a circular flat plate structure having an anchor slot 30 therein to receive an anchor member 32 therethrough. The anchor slot 30 is of an acurate configuration which allows for rotation of the vise support plate 22 relative to the main anchor 20. On reaching the desired rotated position, the anchor member 32 is operable to clamp the plates 20, 22 together to prevent further relative rotation thereof. This adjustment feature operates in a substantially conventional nature as found on prior art vise structures.

The manual vise assembly 16 includes (1) a stationary jaw assembly 36; (2) a movable jaw assembly 38 connected to the stationary jaw assembly 36; and (3) a vise actuator assembly 40 which is operable to selectively move the movable jaw assembly 38 relative to stationary jaw assembly 36 as will be explained.

The stationary jaw assembly 36 includes a stationary support housing 44 having a stationary jaw member 46 integral therewith. The stationary support housing 44 presents a solid structure having an upper hammer surface 47 thereon usable in a conventional manner. The stationary jaw member 46 includes an outer jaw section 48 operable to cooperate in a clamping fashion with the movable jaw assembly 38 as will be explained.

The movable jaw assembly 38 includes a movable support housing 50 with a movable jaw member 52 having an outer jaw section 48. The movable jaw member 52 is movable toward the stationary jaw member 46 for a clamping action on an object to be contained therebetween.

The vise actuator assembly 40 includes a main actuator shaft assembly 54 in cooperation with an actuator housing assembly 56.

As best shown in the exploded view of FIG. 3, the actuator shaft assembly 54 includes an elongated shaft member 62 having a transversely extended handle member 64 secured to an outer end thereof. The shaft member 62 has external threads 66 extended substantially the length thereof and formed on one end with a head section 68. The external threads 66 are adapted to cooperate with similar female threads in an actuator sleeve member as will be explained in detail.

The head section 68 is provided with a handle hole 72 therethrough operable to receive the handle member 64 therein.

As noted in FIG. 1, the handle member 64 can be of any length and is provided with a main body 76 with a cap section 78 at one end and a removable connector cap member 80 at the opposite end. The removable connector cap member 80 is provided so that it can be selectively removed from the outer threaded end of the main body 76 and the entire handle member 64 removed from the handle hole 72 if so desired when utilizing the vise structure of this invention in its automatic use mode.

The actuator housing assembly 56 includes (1) a main body member 82; (2) an anchor assembly 84; (3) an automatic control member 86; and (4) a lock member 88. The main body member 82 includes an elongated cylindrical sleeve 87 having an internal longitudinal hole 89 therein.

As noted in FIG. 3, the anchor assembly 84 includes an anchor plate 92 engagable against the stationary support housing 44 and secured thereto by bolt member 94 to keep the actuator shaft assembly 54 secured in the cylindrical sleeve 87.

The automatic control member 86 is provided with a hole 96 therein having internal threads 98 adapted to receive the lock member 88 therein.

The lock member 88 is a threaded bolt type structure having its external threads engagable with the internal threads 98 in the hole 96 and selectively engagable with the shaft member 62 of the actuator shaft assembly 54 to lock and unlock the same against rotation on changing from the manual to the automatic vise operation as will be explained.

The automatic vise assembly 18 includes (1) an automatic actuator assembly 100; (2) a power drive assembly 102 operable to actuate the automatic actuator assembly 100; and (3) a pneumatic control assembly 104 operable to control operation when in the automatic vise mode condition. The automatic actuator assembly 100 includes an actuator sleeve member 108 and a sleeve lock member 110.

Figure 4:
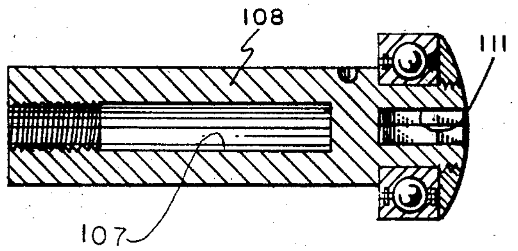
FIG. 4 is an enlarged sectional view of an actuator sleeve member of this invention taken along line 4—4 in FIG. 3.

The actuator sleeve member 108 is a cylindrical structure connected to one end of the power drive assembly 102 through a square drive socket 109 and a similary shaped opening 111 (FIG. 4) in the actuator sleeve member 108. The actuator sleeve member 108 has a central hole 107 with internal threads 101 adapted to receive the inner end of the threaded shaft member 62 of the actuator shaft assembly 54 to achieve movement of the movable jaw assembly 38 in a manner to be explained.

The sleeve lock member 110 is basically a bolt member mounted within a hole 115 which is threaded and the sleeve lock member 110 is engagable with a rear portion of the actuator sleeve member 108 to hold the same against rotation when in the manual vise mode condition as will be explained.

The power drive assembly 102 includes a main drive motor member 114 secured to a mounting bar assembly 116.

The drive motor member 114 as illustrated herein is a small elongated type motor which can be pneumatically or fluid operated and such motors are well known in the prior art. The fluid power source is supplied in one of two directions into the drive motor member 114 so as to be rotatable in opposite directions which is necessary for any vise structure operation.

The mounting bar assembly 116 includes a bar member 119 and a pair of strap members 121. The mounting bar member 119 has spaced holes 117 therein to receive bolt members 120 therein to secure the same to the stationary support housing 44 as clearly shown in FIG. 3. In fact, a couple of strap members 121 encircle the drive motor member 114 and are operable to anchor the same against movement against the mounting bar member 119.

The pneumatic control assembly 104 includes (1) an inlet control line 121 to provide a power source such as a fluid air supply; (2) a pressure regulator valve 122 secured at one side to the inlet control line 121; (3) an outlet control line 123 secured on an opposite side of the pressure regulator valve 122; (3) an actuator control member 128 adapted to be connected to the outlet control line 123; and (4) motor supply lines 130, 132 operably connected from the actuator control member 128 to the drive motor member 114 of the power drive assembly 102 to selectively rotate the actuator sleeve member 108 in opposite directions as will be explained.

The pressure regulator valve 122 is operable in a conventional manner so as to operate at a preset, even predetermined pressure flow so as to serve (1) as a safety factor for non-overloading and causing damage to the vise structure; and (2) achieving more consistant and smooth operation thereof.

The actuator control member 128 is of a conventional nature having a movable peddle member 129 which can be pivotal about its center point in either direction to not only control the amount of air flow but also the direction thereof to rotate the drive motor member 114 in a selected direction. The actuator control member 128 is known in the prior art in the pneumatic control field.

USE AND OPERATION OF THE INVENTION

Referring to the assembled condition in FIG. 1 of the combination automatic and manual vise apparatus 12 of this invention, it is seen that the main support base assembly 14 through the main anchor plate 20 is secured by nut and bolt members through the anchor holes 28 to a horizontal support surface. The vise support plate 22 is connected by the connector member 24 so that the vise support plate 22 is readily rotatable relative to the main anchor plate 20. When rotated to the desired position, the anchor member 32 is extended through the anchor slot 30 and screwed downwardly to clamp the vise support plate 22 against the main anchor plate 20 so they are not unintentionally moved relative to each other.

On using the combination automatic and manual vise apparatus 12 of this invention in the manual vise mode operation, the lock member 88 is screwed outwardly from its hole 96 so that the inner portion thereof is no longer engaged with the shaft member 62. The shaft member 62 can now be readily rotated through use of the handle member 64 in a conventional manner. In this manual mode operation, it is required that the sleeve lock member 110 in the lock hole 115 is screwed downwardly to engage the actuator sleeve member 108 to hold same against rotation.

In the manual mode operation, the handle member 64 is thereupon rotated which rotates the shaft member 62 within the sationary sleeve 108 within its internal threads 111 which will act to selectively move the movable jaw assembly 38 along its axis toward and away from the stationary jaw member 46 to achieve a clamping function.

In operation as an automatic vise apparatus, the lock member 88 is moved within the hole 96 into engagement with an indent in an outer end portion of the shaft member 62 of the actuator shaft assembly 54. This operates to anchor the shaft member 62 to the movable support housing 50. At this time, the handle member 64, due to the fact that the connector cap member 80 is screwed on the main body 76, it can be removed and the entire handle member 64 removed.

Also, at this time, the sleeve lock member 110 is backed outwardly of the lock hole 115 so that the actuator sleeve member 108 is driven through the drive socket 109 and opening 111 by the drive motor member 114. The drive motor member 114 is operated through the pneumatic control assembly 104 to achieve rotation in opposite directions of the actuator sleeve member 108.

On rotation of the actuator sleeve member 108 having the inner end of the shaft member 62 mounted within the internal threads 101, then, this with the shaft member 62 being stationary, would cause inward and outward movement of the movable jaw assembly 38 under the control and operation of the power drive assembly 102 and pneumatic control assembly 104.

The foot operated pneumatic control assembly 104 can be operated in a conventional manner so as to rotate the drive motor member 114 selectively in opposite directions. Also, the depression or operation of the actuator control member 128 can control the volume of air being used so as to control the axial speed of movement of the movable jaw assembly 38.

Also, the use of the pneumatic or fluid pressure can provide a safety feature so that only a maximum amount of pressure can be asserted between the stationary jaw member 46 and the movable jaw member 52 so as to prevent damage such as crushing of items being held with the vise jaws of this invention. This can be an important feature when dealing with fragile parts like plastic as this control feature would prevent damage thereof. Of course, a pressure relief valve could be installed in the outlet control line 123 or the motor supply lines 130, 132 so as to assure that excessive fluid pressure is not utilized.

It is seen that the combination automatic and manual vise apparatus of this invention is easy to install in a conventional manner on a workbench and having a pneumatic drive motor connected thereto which does not take up much space. Additionally, it is noted that this invention would permit easy conversation of a conventional manual vise apparatus to an automatic pneumatic operation with slight modification thereof and, therefore, this invention could be sold in a kit form.

The combination automatic manual vise apparatus of this invention is sturdy in construction; reliable in operation; substantially maintenance free; easy to operate; and economical to manufacture.

While the invention has been described in conjunction with preferred specific embodiments thereof, it will be understood this description is intended to illustrate and not to limit the scope of the invention, which is defined by the following claims.

I claim:

1. A combination automatic and manual vise apparatus, comprising:

(a) a main support base assembly connectable to a support surface to hold same against movement;

(b) a manual vise assembly connected to said main support base assembly;

(c) said manual vise assembly includes (1) a stationary jaw assembly; (2) a movable jaw assembly mounted on said stationary jaw assembly for relative movement thereto; and (3) a vise actuator assembly engagable with said movable jaw assembly and operable to move said movable jaw assembly relative to said stationary jaw assembly;

(d) said vise actuator assembly having an actuator shaft assembly mounted within an actuator housing assembly;

(e) said actuator shaft assembly includes a shaft member which is selectively locked to the said actuator housing assembly for non-rotational movement or releasable therefrom for relative rotation thereto;

(f) an automatic vise assembly operably connected to the manual vise assembly having an automatic actuator assembly selectively operable through a power drive assembly; and (g) said automatic actuator assembly included an actuator sleeve assembly engagable with said shaft member and selectively operable to be locked against rotation or unlocked for rotational movement;

whereby said actuator sleeve member when in a locked condition permits said shaft member when in the unlocked condition to rotate and move the movable jaw assembly in a manual mode operation relative to said stationary jaw assembly.

2. A combination automatic and manual vise apparatus as decribed in claim 1, wherein:

(a) said automatic actuator assembly having said actuator sleeve member placed in the unlocked condition while said shaft member is in said locked condition relative to the actuator housing assembly and said power drive assembly is operable to rotate said actuator sleeve member which said movable jaw assembly in the automatic operation mode.

3. A combination automatic and manual vise apparatus described in claim 1, wherein:

(a) said actuator shaft assembly includes a handle member connected to said shaft member and removable therefrom so that said handle member can be removed when in the automatic operation mode assembly.

4. A combination automatic and manual vise apparatus as described in claim 3, wherein:

(a) said actuator housing assembly includes a lock member which is mounted within a control hole and movable axially into locked and unlocked conditions with said shaft member to selectively permit and disallow rotation thereof.

5. A combination automatic and manual vise apparatus as described in claim 1, wherein:

(a) said automatic vise assembly includes a pneumatic control assembly having an air inlet supply connected to a pressure regulator valve which, in turn, is connected to an actuator control member that is connected to said power drive assembly;

(b) said power drive assembly includes a drive motor member which is connected to said actuator control member whereupon said drive motor member can be selectively operated in opposite directions to move said movable jaws assembly relative to said stationary jaw assembly in the next automatic operation mode.

6. A combination automatic and manual vise apparatus as described in claim 1, wherein:

(a) said automatic vise assembly includes an automatic actuator assembly having an actuator sleeve member which is selectively locked in position by a sleeve lock member or released therefrom for free rotation; and (b) said actuator sleeve member engages an inner end of said shaft member and is selectively rotatable relative to said shaft member which is stationary to provide for axial movement of said movable jaw assembly.

7. A combination automatic and manual vise apparatus as described in claim 6, wherein:

(a) said automatic vise assembly having a lock member selectively engagable with said actuator sleeve member to anchor same against rotational movement in the manual operation mode and release same for rotational movement in the automatic operation mode.

8. A combination automatic and manual vise apparatus comprising:

(a) main support base assembly;

(b) a manual vise assembly connected to said main support base assembly;

(c) an automatic vise assembly connected to said manual vise assembly;

(d) said manual vise assembly includes a stationary jaw assembly secured to said main support base assembly and a movable jaw assembly operably connected to said stationary jaw assembly for relative movement thereof;

(e) said manual vise assembly includes a vise actuator assembly having an elongated actuator shaft assembly with a shaft member which is rotated to move said movable jaw assembly relative to said stationary jaw assembly when in the manual mode operation; and said vise actuator assembly having a lock member to engage said actuator shaft assembly to hold same against rotational movement when in the automatic mode operation; and (f) said automatic vise assembly connected to said movable jaw assembly and having a portion thereof rotatable to move said movable jaw assembly when said shaft member is in the locked condition relative to said stationary jaw assembly.

9. A combination automatic and manual vise apparatus as described in claim 8, wherein:

(a) said actuator shaft assembly includes said shaft member having external threads thereupon; and (b) said automatic vise assembly includes an actuator sleeve member having internal threads thereon, threaded to receive the outer end of said shaft member so as to move said shaft member axially relative thereto on rotation of said actuator sleeve member.

10. A combination automatic and manual vise apparatus as described in claim 9, wherein:

(a) said shaft member having external threads engagable with internal threads in said actuator sleeve member.

11. A combination automatic and manual vise apparatus as described in claim 8, wherein:

(a) said automatic vise assembly includes an automatic actuator assembly operably connected to said actuator shaft member to selectively move said movable jaw assembly in the automatic operation mode.

12. A combination automatic and manual vise apparatus as described in claim 11, wherein;

(a) said automatic vise assembly includes a power drive assembly connected to said automatic actuator assembly to selectively rotate same in opposite directions in the automatic operation mode.

13. A combination automatic and manual vise apparatus as described in claim 12, wherein:

(a) said automatic vise assembly includes a control assembly connected to said power drive assembly and to a fluid power source; and (b) said control assembly includes an actuator control member operable to selectively drive said power drive assembly.

14. A combination automatic and manual vise apparatus as described in claim 12, wherein:

(a) said power drive assembly includes a fluid drive motor member to drive said automatic actuator assembly.

15. A combination automatic and manual vise apparatus comprising:

(a) main support base assembly;

(b) a manual vise assembly connected to said main support base assembly;

(c) an automatic vise assembly connected to said manual vise assembly;

(d) said manual vise assembly includes a stationary jaw assembly secured to said main support base assembly and a movable jaw assembly operably connected to said stationary jaw assembly for relative movement thereof;

(e) said manual vise assembly includes a vise actuator assembly having an elongated actuator shaft assembly with a shaft member which is rotated to move said movable jaw assembly relative to said stationary jaw assembly when in the manual mode operation; and said vise actuator assembly having a lock member to engage said actuator shaft assembly to hold same against rotational movement when in the automatic mode operation;

(f) said automatic vise assembly connected to said movable jaw assembly and having a portion thereof rotatable to move said movable jaw assembly when said shaft member is in the locked condition relative to said stationary jaw assembly; and (g) said automatic vise assembly includes an automatic actuator assembly operably connected to said manual vise assembly to axially move said movable jaw assembly when in the automatic operation mode.

16. A combination automatic and manual vise apparatus as described in claim 15, wherein;

(a) said automatic vise assembly includes an actuator sleeve member and a sleeve lock member to (1) hold said actuator sleeve member against rotation when in the manual operation mode; and (2) to release said actuator sleeve for rotation when in the automatic operation mode.

* * * * *